Sept. 27, 1955   O. F. JOHNSON   2,719,213
HEAT SHIELD
Filed July 21, 1949
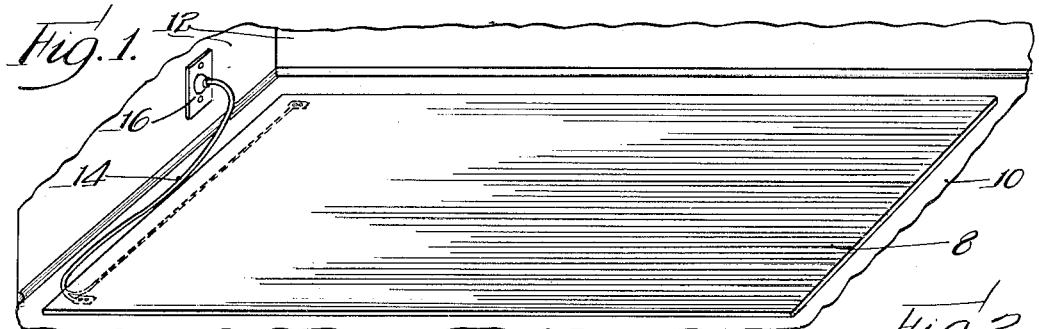
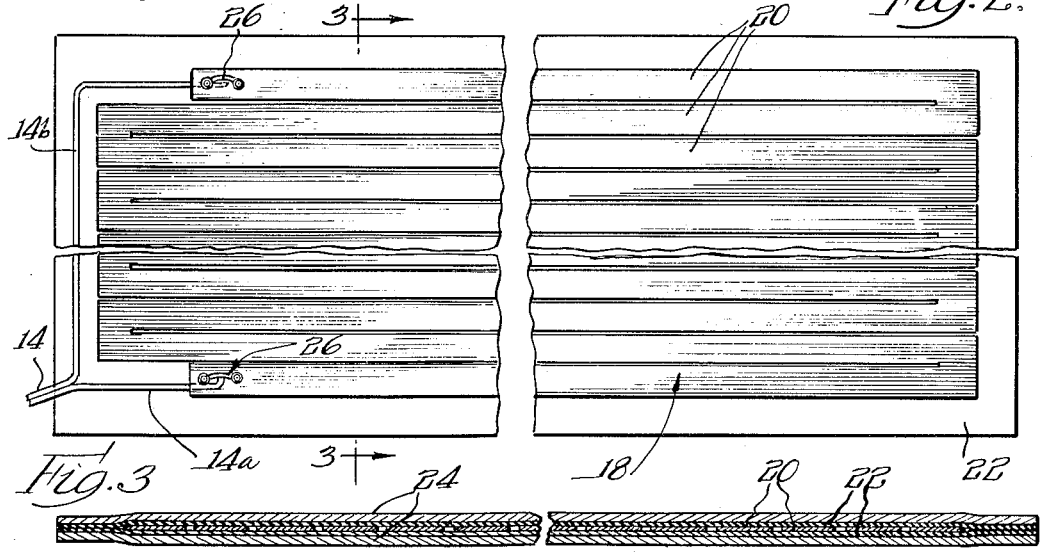
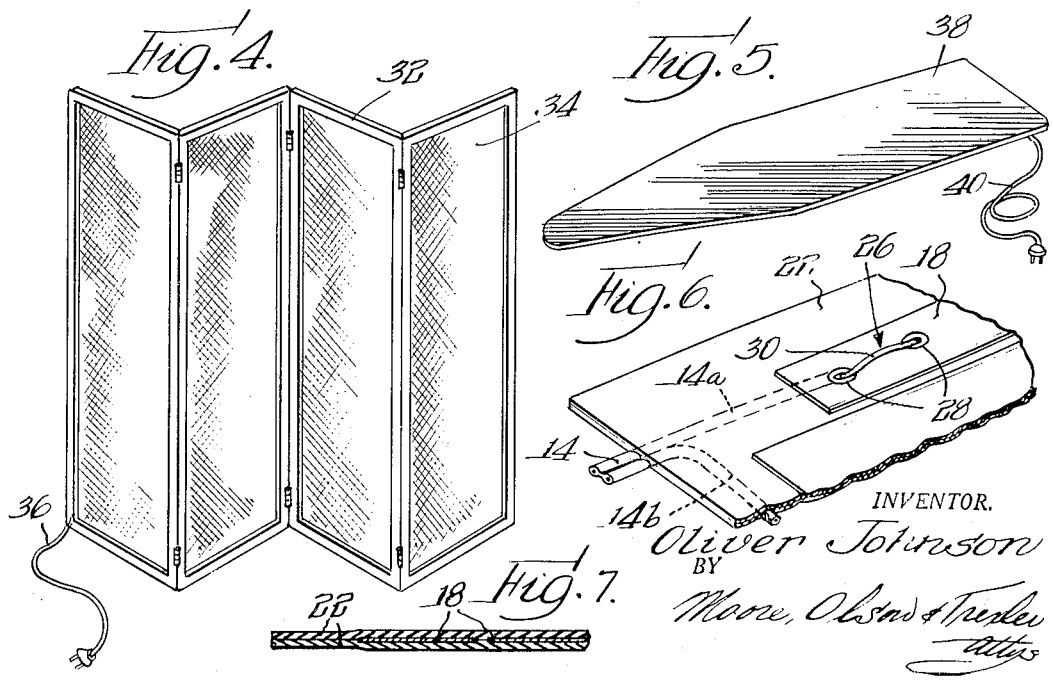
INVENTOR.
Oliver Johnson
BY
Moore, Olstad & Trexler
attys

2,719,213
HEAT SHIELD

Oliver F. Johnson, Chicago, Ill.

Application July 21, 1949, Serial No. 106,008

1 Claim. (Cl. 219—46)

This invention is concerned with heating and more particularly relates to a means for heating a surface in which the heating element is operated at a relatively low temperature.

Generally, a person or other object has been kept warm in the past by the aid of heat from a localized source such as a fire, radiator or the like, all of which have operated at a rather high temperature. As heat is always transferred from a body or source of high temperature to one of low temperature, with the rate of transfer dependent on the temperature differential, heat passes satisfactorily from a localized source of heat, such as the aforementioned radiator, to a human body or other object at a lower temperature. However, the heat is transferred only to the part of the body toward the source, and as the body itself may be warmer than other objects such as floors, walls or furniture, heat will be transferred from the body to these latter objects.

In order to obviate the unsatisfactory qualities of uneven heating from a localized source, it has been proposed that a source of a very large area should be used. Difficulty generally has been encountered in uniformly heating a desirably large area. Heating pipes or electrical heating elements arranged in a grid leave spaces which are not heated to as high a temperature as the areas immediately adjacent the pipes or grids, and uneven heating therefore results.

The above mentioned heating means all depend on adding heat to a body. It is recognized, however, that a human body or other object may be maintained at a comfortable or desirable temperature by preventing the transfer of heat from the body or object, preferably from all parts of the body or object, if possible. The present invention contemplates achieving this end by heating a comparatively large surface to a relatively low temperature, just slightly above that of the body or object from which it is desired to prevent heat flow, or if heated area is sufficiently large the temperature may actually be below body temperature.

Operation at a relatively low temperature has the further advantage of preventing destruction of the heating element by the expansion and contraction thereof attendant upon the temperature variation inherent in a heating source operating at a high temperature.

Among the important objects of this invention is the provision of means for heating a large area to a relatively low temperature.

A more specific object of the present invention is to provide an electrically heated heating means in which the heating element occupies nearly 100 per cent of the area within its external boundaries.

A further object of the present invention is to provide an electrically-operated heating element comprised of conductive sheet material, the material being of inherently low resistance.

Other and further objects and advantages of the present invention will be apparent upon reading the following description when taken in conjunction with the accompanying drawings in which:

Fig. 1 is a perspective view of a rug pad embodying the present invention;

Fig. 2 is a plan view of the rug pad as shown in Fig. 1 with certain parts removed;

Fig. 3 is a cross sectional view taken along the line 3—3 in Fig. 2;

Fig. 4 is a perspective view of the invention as embodied in a portable screen;

Fig. 5 is a perspective view of the invention as embodied in an ironing board pad;

Fig. 6 is a perspective view showing a terminal of the heating element of the present invention; and Fig. 7 is a fragmentary sectional view similar to Fig. 3.

Although it is contemplated that the present invention could be used in the walls, floors or ceilings of a room, it is of great utility in portable units. As shown in Figs. 1–3, a portable unit, namely a rug pad 8, embodies the invention. The rug pad is shown as resting on the floor 10 of a room having walls 12. A line cord 14 provides electrical power to the pad from a wall socket 16.

The heating element included in the rug pad comprises a grid 18 preferably of material which has an inherently low resistance compared to the usual resistance elements of nickel-chromium alloy or the like. Preferably, the grid is made of aluminum foil, although it is contemplated that the grid could be comprised of a metallic substance or other conductive material sprayed or otherwise applied to an insulating surface, or of metal or the like deposited by means such as vaporization or adhesion or by electrostatic or magnetic means. The elements 20 of the grid are very wide compared with their thickness and are placed very close together. Due to the thinness of the elements and the considerable total length of the grid, the total resistance of the grid is sufficient that the unit may be operated directly from any power source, such as the commercial 110 volt lines common in the United States, or any other predetermined steady voltage supply and yet produce the desired resultant temperature gain. The number of strips of the element placed across the power source leads to a very small voltage gradient between adjacent strips. Consequently, little insulation is needed between strips and the grid may occupy nearly 100 per cent of the area included within its outline. It is to be understood that although a grid has been spoken of, for convenience and clarity, as comprised of a single element sinuously arranged to form a grid, that the element could be arranged otherwise, as for instance a spiral or a single large sheet.

On each side of the grid is arranged a sheet of flexible material 22 of special construction. This flexible material is substantially flameproof and moisture resistant, and is relatively impenetrable so that the heating unit will not be ruptured when suddenly contacted by sharp objects, such as a pin in the hands of a small child. The unit may have a sheet of felt 24 or other desirable material placed on each side of the flexible material 22 to give resiliency and insulation to the pad. All of the various layers are preferably permanently bonded together to form a pad although the pad may be used with only the grid 18 and the aforementioned flexible material 22, omitting the felt as shown in Fig. 7, and the various layers may not necessarily be bonded together.

As it would be exceedingly difficult to solder lead wires to the very thin material comprising the grid, special terminals 26 are provided. As best seen in Fig. 6, terminal 26 includes a pair of grommets 28 placed adjacent to one end of the grid 18 and securely gripping the grid and one of the flexible sheets 22. The grommets are preferably of nonferrous material, and a wire 30 may be looped through the grommets and soldered or otherwise secured in electrical contact therewith. One of the lead wires 14a may be looped over one of the wires 30 and soldered thereto, or may be looped through the grommets and secured, while the other lead wire 14b leads to the terminal 26 at the opposite end of the grid and is secured in the same manner.

The embodiment of my invention in a rug pad, as just described, is of particular utility when there are small children in a home. There is no danger of a child being chilled by a cold floor, nor is there the danger of his being burned by a hot radiator or the like. The pad could, if desired, be finished with a layer of linoleum or any other floor covering materials and constitute a floor covering itself.

A further embodiment of my invention is shown in Fig. 4 as a portable screen. The screen is particularly useful for dressing in a cold room or for surrounding a crib to shield a baby's body warmth. Although a special frame for the screen may be constructed, it is not necessary to do so as any folding frame 32 may be used. In this embodiment, the grid 18 and the moisture resistant, flame resistant, impenetrable material 22 are used, as previously described, although the pad 24 of felt or the like is not used. A decorative covering, as of wallpaper, may be applied if desired. The panels may be wired in series, in parallel or in series-parallel as required to develop the desired temperature from the voltage available and the number of panels and consequent length and resistance of the grid 18. A line cord 36 may lead from one corner of the screen, as shown, to any convenient electrical outlet and may be permanently or detachably secured to the screen.

A further embodiment of my invention is shown in Fig. 5, this being in the form of an ironing board pad 38. Often it is impossible to properly press clothing and the like as moisture passes from the cloth into the ironing board pad which becomes wet or damp and prevents the material being ironed from being properly dried. This is obviated by utilizing a pad 38 of substantially the same construction as the rug pad 8, previously described. Although it is preferred that the embodiments, such as the rug pad and portable screen, should operate at a temperature just slightly above that of a human body, it will be desirable to have an embodiment such as the ironing board pad operate at a somewhat higher temperature, as it is associated with an object of higher temperature. Due to its smaller size, this is readily accomplished by having a heating element of shorter length and consequently lower resistance. The same purpose could of course be accomplished by utilizing a heating element of different material. A line cord 40 may lead from one corner of the ironing board pad to any convenient electrical outlet, and it is to be appreciated that this cord, as well as those previously mentioned, is secured to the pad in any suitable fashion to prevent any strain on a terminal. Preferably this cord is provided with a separable socket connection proximate to the pad so that the cord may be detached therefrom.

It is apparent that I have herein presented certain preferred embodiments of a new and improved heating unit which heats a large area uniformly to prevent heat loss from a body rather than adding heat nonuniformly to the body. It is further apparent that the heating element operating at a low temperature will last much longer than one operating at a high temperature, and does not present the danger of a person burning himself on it. Being quite thin, the unit takes up little room and being substantially impenetrable as well as moisture proof, it is practically impossible to obtain a shock from it. Although such has not been shown, it is contemplated that in certain applications the temperature of the heating unit could be varied by the use of a variable transformer to alter the voltage applied across the heating element in order to obtain variable temperatures for changing requirements. Other applications in which my invention may be used advantageously include pads to be hung on walls or over frames as in garages, aircraft hangers, industrial plants, or cow barns, or pads to be placed on mechanics' creepers, on mattress board pads or to be hung in drying ovens in paint shops, in bakeries, or in paper mills.

Although I have shown and described certain preferred embodiments of my invention, it is to be understood that these are for illustrative purposes, only, and I wish to include all forms that may fall within the spirit and scope of the appended claims.

I claim:

An electrical heating unit comprising a grid of inherently low resistance material, the elements of said grid being wide and thin and arranged in single thickness throughout and covering substantially all of the area included within the outline of said grid, a substantially flexible and impenetrable sheet of material on each side of said grid, the grid and sheets being permanently bonded together to present a smooth surface throughout, and a terminal for each end of the grid and comprising a pair of grommets of material having an affinity for solder crimped against said grid and a wire spanning the space between each grommet and secured thereto for receiving a conductor lead.

References Cited in the file of this patent

UNITED STATES PATENTS

| Number | Name | Date |
|---|---|---|
| 1,992,593 | Whitney | Feb. 26, 1935 |
| 2,107,598 | Colvin, Jr. | Feb. 8, 1938 |
| 2,165,970 | Jaspers | July 11, 1939 |
| 2,251,697 | Van Daam et al. | Aug. 5, 1941 |
| 2,345,300 | Simpson et al. | Mar. 28, 1944 |
| 2,458,184 | Marick | Jan. 4, 1949 |
| 2,467,349 | Van Daam | Apr. 12, 1949 |
| 2,469,466 | Herrington | May 10, 1949 |
| 2,473,183 | Watson | June 14, 1949 |
| 2,487,695 | Cloud | Nov. 8, 1949 |
| 2,511,540 | Osterheld | June 13, 1950 |
| 2,523,353 | Boester | Sept. 26, 1950 |
| 2,523,566 | Glynn | Sept. 26, 1950 |
| 2,559,077 | Johnson et al. | July 3, 1951 |
| 2,569,340 | Bo Sarno et al. | Sept. 25, 1951 |

FOREIGN PATENTS

| Number | Country | Date |
|---|---|---|
| 4,391 | Great Britain | of 1897 |
| 608,924 | Great Britain | Sept. 22, 1948 |